US006820156B1

(12) United States Patent
Miller et al.

(10) Patent No.: US 6,820,156 B1
(45) Date of Patent: Nov. 16, 2004

(54) COMPUTER SYSTEM WITH BUS SOCKET SHOWING CONFIGURED MODE

(75) Inventors: Kevin L. Miller, Austin, TX (US); Ty R. Schmitt, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 458 days.

(21) Appl. No.: 09/896,215

(22) Filed: Jun. 29, 2001

(51) Int. Cl.[7] .................. G06F 13/00; H01R 23/10
(52) U.S. Cl. .................. 710/301; 361/785; 439/55
(58) Field of Search .................. 710/301–302, 710/2, 105, 8, 100, 10, 104, 11, 305, 62; 361/683, 686, 600, 636, 748, 760, 736, 785; 439/43, 55, 928.1; 326/62; 713/300, 100

(56) References Cited

U.S. PATENT DOCUMENTS

| | | | |
|---|---|---|---|
| 3,891,898 A | * 6/1975 | Damon | 361/774 |
| 5,559,965 A | * 9/1996 | Oztaskin et al. | 710/104 |
| 5,611,057 A | 3/1997 | Pecone et al. | 395/282 |
| 5,623,691 A | 4/1997 | Clohset et al. | 395/821 |
| 5,657,455 A | 8/1997 | Gates et al. | 395/280 |
| 5,724,529 A | * 3/1998 | Smith et al. | 710/1 |
| 5,761,527 A | 6/1998 | Clohset et al. | 395/821 |
| 5,841,287 A | * 11/1998 | Duley | 324/537 |
| 6,122,693 A | 9/2000 | Gutta et al. | 710/107 |
| 6,134,621 A | 10/2000 | Kelley et al. | 710/126 |

OTHER PUBLICATIONS

U.S. Pending application Ser. No. 09/769,799 entitled "A System and Method for Configuring an I/O Bus" David A. Locklear et al., Assignee–Dell USA L.P, filed Jan. 25, 2001.

* cited by examiner

Primary Examiner—Gopal C. Ray
(74) Attorney, Agent, or Firm—Baker Botts L.L.P.

(57) ABSTRACT

A computer system includes a circuit board which comprises a bus system for transmitting address, data and control signals with selectable bus configuration, a plurality of bus sockets on the circuit board for connecting an adapter card with the bus signals. The specification of the adapter card determines the configuration of the associated bus, and an indicator for the bus indicating the configuration. The indicator is integrated in the socket.

40 Claims, 7 Drawing Sheets

COMPUTER SYSTEM WITH BUS SOCKET SHOWING CONFIGURED MODE

FIELD OF THE INVENTION

The present invention relates to a computer system, in particular a personal computer system having a bus system such as a PCI/PCI-X bus or similar configurable bus system.

BACKGROUND OF THE INVENTION

Figure 1:
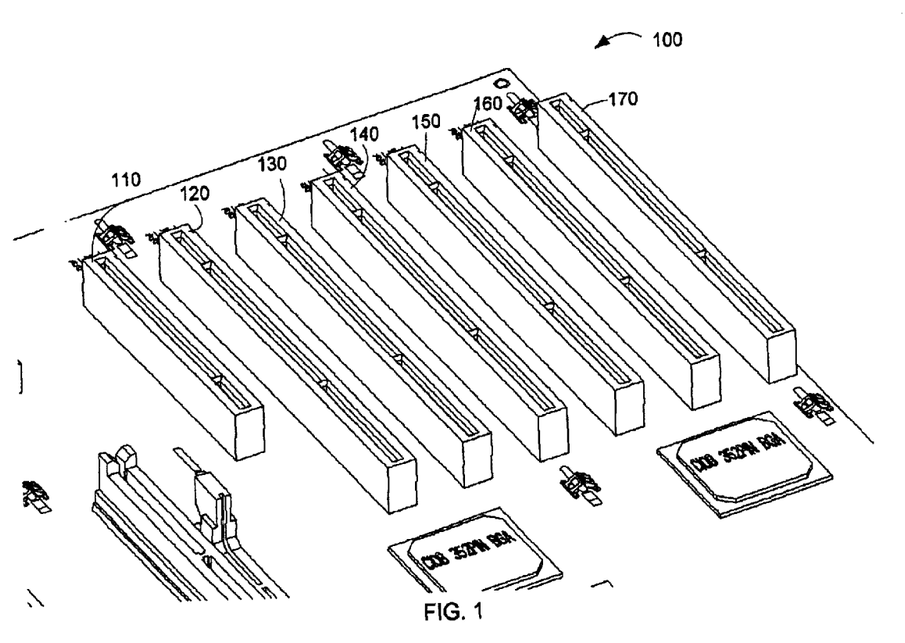
FIG. 1 is a perspective view on a mother board having 7 expansion slots (sockets) according to the prior art.

Personal computers, servers, laptop computer with docking stations, and other computer systems having a bus system for adapter cards are well known in the art. These computer systems typically include a CPU coupled through a cache bridge logic to a main memory. The cache bridge logic also typically couples to a high bandwidth local expansion bus, such as the peripheral component interconnect (PCI) bus or the VESA (Video Electronics Standards Association) VL bus. Typically, a PCI bus comprises two different bus speeds such as 33 MHz and 66 MHz. FIG. 1 shows a plurality of slots (bus sockets) 110–170 which are in general placed on a mother board 100 for coupling with the bus. Sockets 120–170 are configured to receive standard 64 bit PCI adapter cards whereas socket 110 receives a standard 32 bit PCI card. To be compatible with multiple adapter cards inserted into the system the following principle applies for a PCI bus system. Whenever a user inserts an adapter card into the PCI bus sockets the system bus adapter system runs at the speed defined by the slowest adapter card inserted into the bus system.

Another bus with extended capabilities is a newly developed extended peripheral component interconnect (PCI-X) bus. This bus system addresses the need for increased bandwidth of PCI Devices. The PCI-X standard enables the design of systems and devices that can operate at speeds significantly higher than known systems with their respective specification allow. Just as importantly, it provides backward compatibility by allowing devices to operate at conventional PCI frequencies and modes when installed in conventional systems. Devices can be designed to meet PCI-X requirements and operate as conventional 33 MHz and 66 MHz PCI devices when installed in those systems. Furthermore, this bus allows high speed transmission modes, P for example at 133 MHz. Similarly, if conventional PCI devices are installed in a bus capable of PCI-X operation, the clock remains at a frequency acceptable to the conventional device, and other devices on that bus are restricted to using conventional protocol. This high degree of backward compatibility enables the easy migration of systems and devices to bandwidths in excess of established bus systems with limited bandwidths.

Thus, PCI, PCI-X and similar bus systems are defined by the slowest card inserted with regard to their transmission speed. Modern computer systems provide multiple system busses, for example two independent PCI or PCI-X busses. The advantage of having multiple system busses is that in case two busses are provided, one can be used for slower system adapter cards and one can be used for the faster adapter cards. However, a user not familiar with the technology will not recognize which adapter card that has already been inserted provides what transmission speed capabilities. Even so a user not skilled in the art is certainly able to extend a computer system by inserting an adapter card, the user might not know which bus is the appropriate bus for the respective adapter card. The user will of course know the speed of the new card to be inserted into the bus system but will probably not remember the respective speed of already inserted cards. Furthermore, systems usually do not indicate which socket is assigned to which of the independent PCI busses.

U.S. patent application Ser. No. 09/769,799 "RA system and for method for configuring an I/O bus", filed on Jan. 25, 2001 by David Locklear and Michael Wright and assigned to Dell Corp. describes a remedy to this problem. According to this application the mother board of a computer system comprises light emitting diodes associated to each slot of a PCI bus to indicate whether an adapter card inserted into the slot is limiting the transmission speed on the bus associated to the respective slot. However, this system still does not clearly inform a user what specific configuration has been selected to a specific slot. Furthermore, valuable real estate area on the mother board has to be used to place indicators such as light emitting diodes.

SUMMARY OF THE INVENTION

Therefore, a need for an improved bus system exists which overcomes the above mentioned problems. In one embodiment of the present invention a computer system including a circuit board comprises a bus system for transmitting address, data and control signals with selectable bus configuration, a plurality of bus sockets on the circuit board for connecting an adapter card with the bus signals, whereby the specification of the adapter card determines the configuration of the associated bus, and an indicator for the bus indicating the configuration, wherein the indicator is integrated in the socket.

A method of indicating a bus speed within a computer system having a system bus with a plurality of sockets for receiving system adapter cards, whereby the specification of said adapter cards determines the bus configuration, and whereby said socket comprises an integrated indicator, comprises the steps of:

inserting an adapter card in one of the sockets;

determining and setting the bus speed for all sockets associated to the bus;

indicating the bus configuration for the bus by the indicator.

In another embodiment a socket for a computer bus system for connecting a plurality of address, data and control signals to an adapter card which can be plugged into said socket, comprises an indicator for indicating a bus configuration.

The indicator may indicate the current bus speed and/or other configuration parameters, such as bus width, transmission modes, etc. Furthermore, a socket for the bus system may have an integrated driver and control circuit for driving the indicator. The indicator can be a light diode or a display, such as an alphanumeric or numeric LCD or LED display. For a hot-plug feature an activation switch and further indicators may be provided. The bus system can be a PCI and/or PCI-X bus or any other configurable bus system. The socket can be designed to be equal in size compared to a socket according to the prior art. However, in another embodiment, the socket may be enlarged to receive the indicator. In yet another embodiment, the socket may have left and right side walls, whereby an upper portion of one of the side walls is extended outwards to receive the integrated indicator. In yet another embodiment, only a partial extension of a side wall may be provided to receive the integrated indicator and/or switch.

The different exemplary embodiments according to the present invention provide a user with all necessary information to insert an adapter card in an appropriate bus socket whereby precious real estate on a system board is preserved. The socket according to the present invention may be equal in size to sockets according to the prior art or designed in a way that the design of a previously designed circuit board which receives such a bus socket does not have to be redesigned. Modification to a bus socket to be able to integrate an indicator can be performed according to the present invention to allow placement of devices close to sockets according to the prior art.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 2:
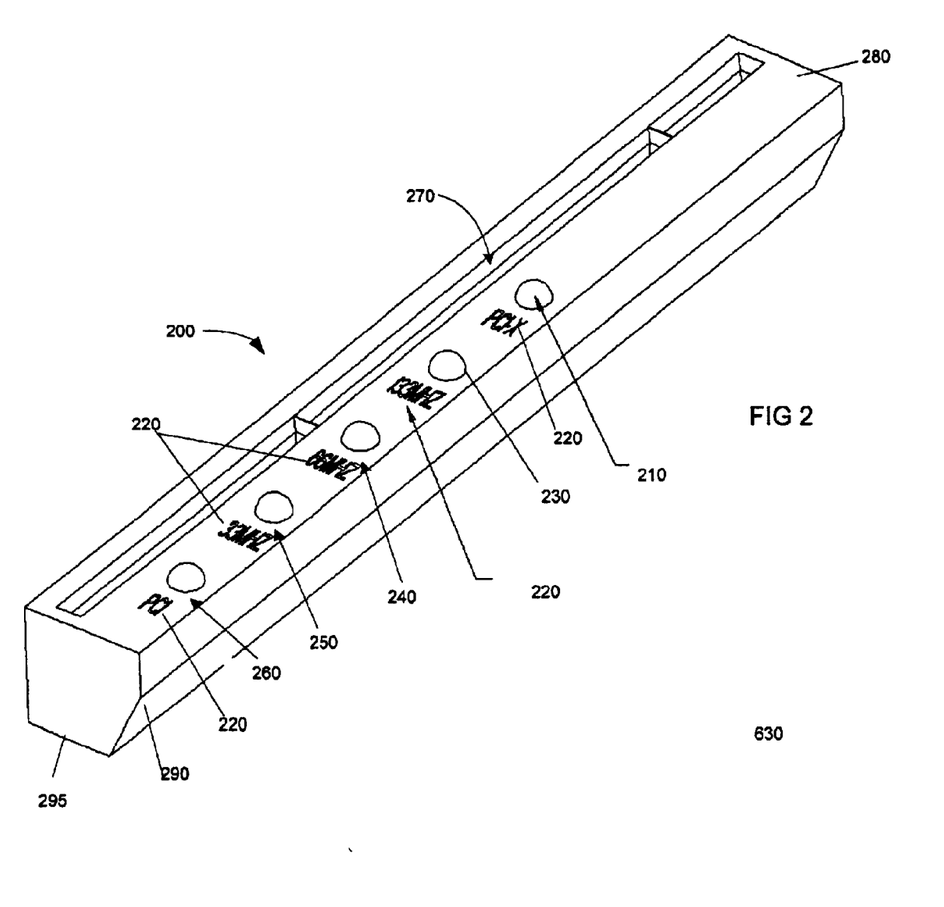
FIG. 2 is a first embodiment of a bus socket according to the present invention.

Turning to the drawings, exemplary embodiments of the present application will now be described. FIG. 2 depicts an improved bus socket 200 suitable to be placed on a mother board of a computer system. Socket 200 comprises a slot 270 including the respective electrical connectors for receiving an adapter card. Socket 200 has a similar shape compared to a socket according to the prior art as shown in FIG. 1, numeral 120–170. The socket comprises two sidewalls. The top face plate 280 of socket 200 is extended to the right in comparison to sockets according to the prior art to embed five light emitting diodes (LEDs) 210, 230, 240, 250, and 260. These LEDs 210, 230, 240, 250, and 260 are placed within the lower portion of face plate 280. In addition, the first embodiment according to the present invention shows engravings 220 below each LED 210, 230, 240, 250, and 260 indicating the function of the associated LED 210, 230, 240, 250, and 260. For example, LED 210 indicates whether the bus operates in a PCI-X mode. The shape of the socket is furthermore optimized to only occupy a minimum of real estate on a main circuit board of a computer system. Therefore, socket 200 comprises a cut off portion 290 within the lower area thus thinning the bottom plate 295 with respect to face plate 280 which directly faces the main circuit board. In this embodiment, the cut off portion 290 is created by the right side wall being phased at about mid height. Thus the width of the socket at the bottom is about the same as the width of sockets 120–170 shown in FIG. 1. In another embodiment, the cut off area can be even bigger to create a bottom face plate 480 being substantially the same as a that of a standard socket. Thus, socket 200 allows placement of devices in-between two or more sockets as will be explained later. LED 230 indicates whether PCI-X bus operates with 133 MHz. LED 240 indicates whether PCI or PCI-X bus operates with 66 MHz, and LED 250 indicates whether PCI bus operates with 33 MHz. Furthermore, LED 260 indicates whether the bus operates in a PCI mode. The socket is designed to either include the driver circuits for the LEDS and receive all necessary signals from the slot connectors (not shown) or provide additional contacts to supply the LEDs 210, 230,240,250, and 260.

Figure 3:
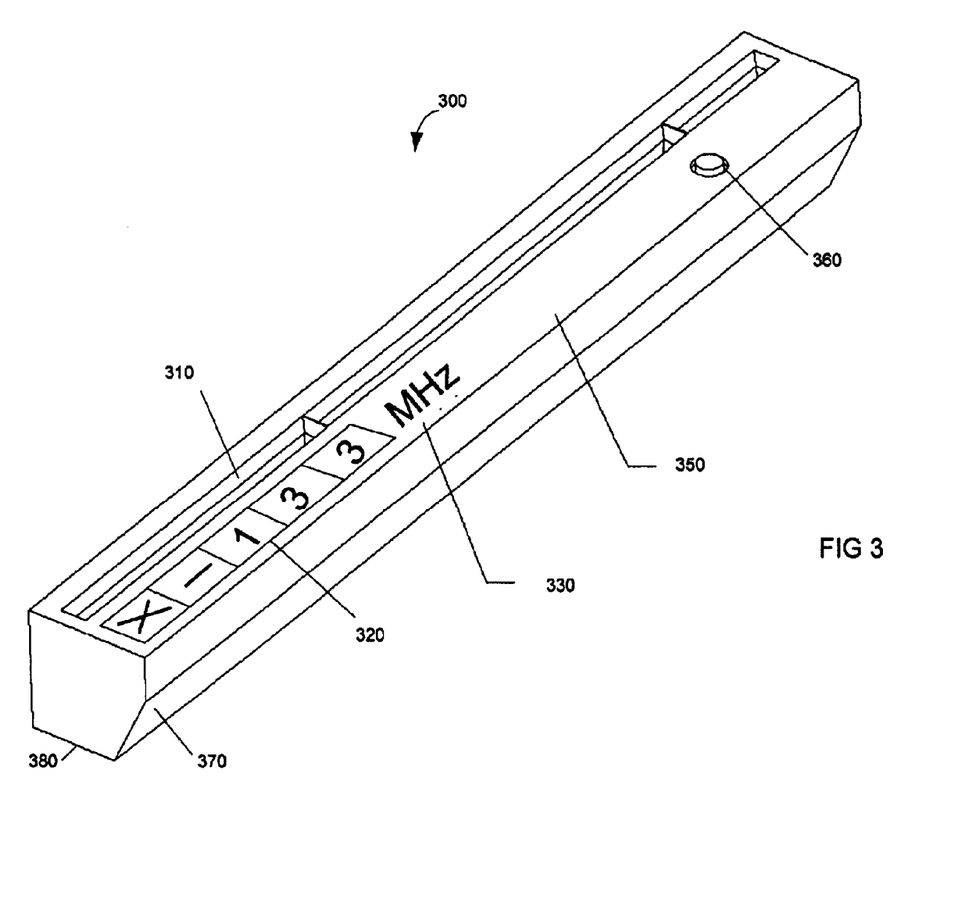
FIG. 3 is a second embodiment of a bus socket according to the present invention.

FIG. 3 depicts a another embodiment of the present invention. Numeral 300 designates the socket suitable to receive an adapter card within a slot 310. Again, slot 310 comprises all necessary connectors to supply an adapter card with all necessary signals of a respective bus, such as a PCI-X bus. Socket 300 comprises a top face plate 350 which is extended to provide space for a display 320. Again, the shape of the socket is optimized to only occupy a minimum of real estate on a main circuit board of a computer system. Therefore, socket 300 comprises a cut off portion 370 as described in combination with FIG. 2 within the lower area thus thinning the bottom plate 380 which directly faces the main circuit board. Thus, socket 300 allows placement of devices in-between two or more sockets as will be explained later. Display 320 can be a numerical or alpha-numerical display of the LED or LCD type. Display 320 provides enough characters to be able to indicate different bus modes according to the respectively used bus standard. In addition, an engraving 330 may be provided to indicate a unit, such as "MHz", as a unit of a variable parameter. If more than one parameter of an applied bus standard varies multiple displays may be provided. Furthermore, socket 300 provides an optional embedded switch 360 placed in the upper right corner of top face plate 350. Switch 360 can serve to provide a so-called hot-plug feature as will be explained later. Again, socket 300 is designed to either include the driver circuits for the display 320 and switch 360, and receive all necessary signals from the slot connectors (not shown) or provide additional contacts to supply the switch 360 and display 320 with respective signals.

Whenever a user installs an adapter card into a socket according to one of the embodiments of the present invention the system checks the bus requirements for this card. if the card matches the current setting no mode or frequency change will occur. However, if the card can only operate a lower bus speed and/or with a different bus mode setting (for example, PCI or PCI-X mode), the entire bus will be reconfigured to allow this card to operate properly.

The embodiment shown in FIG. 3 indicates with a first character whether the bus operates as a PCI-X bus or as a PCI bus by showing either a "X" or a space character. The following characters are used to indicate the current bus speed. For example, "133 MHz" as shown in FIG. 3. If other parameters are defined for a specific bus, in another embodiment the display may toggle between different display information. For example, the display may show the bus speed as "133 M" for a predefined period of time followed by the display "X-64B" indicating PCI-X bus mode which operates with a 64 bit wide bus and then display the bus speed again, etc. In this embodiment no engraving is needed. In addition, switch 360 provides more functionality in combination with display 320. Switch 360 serves to activate the hot-plug feature. When activated, a card can either be inserted, removed, or exchanged. To this end, the user operates switch 360. The computer system comprises respective circuitry that deactivates the power supply for the respective socket. Furthermore, bus signal lines are switched to either a floating state or are deactivated so that removing or inserting an adapter card does not destroy or interfere with any sensitive electronic component on the mother board or the respective adapter card. Display 320 can now display the status of the respective slot. For example, display 320 can display "FREE" or "OFF" indicating that a respective card can be removed or inserted. In addition, display 320 can still show all other parameters with respective time gaps as explained above to inform the user about the bus parameters. The switch can have locked positions or operate as a button switch.

Figure 4:
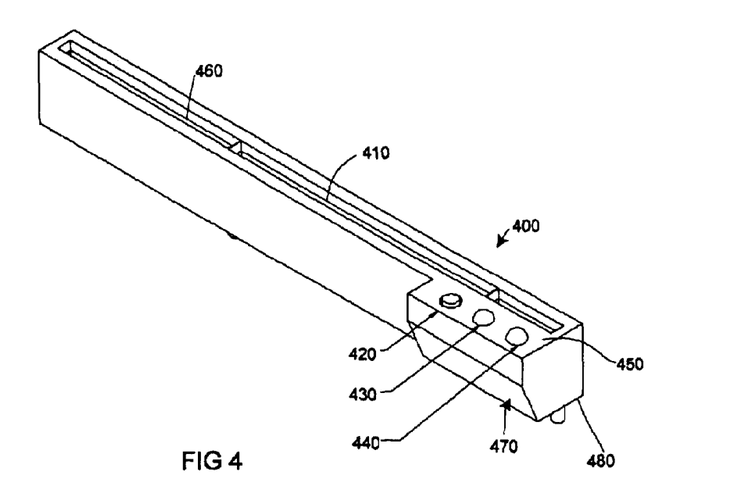
FIG. 4 is a third embodiment of a bus socket according to the present invention.

FIG. 4 depicts yet another embodiment of the present invention. Numeral 400 indicates a socket according to this embodiment. The shown socket 400 comprises a slot for receiving an adapter card. The bottom portion 460 of the socket is designed in accordance with the standard sockets known in the prior art. However, the top portion comprises an enlarged area with a top face plate 450. Again, the bottom part has a cut off section 470 thus thinning the part of the socket which faces a mother board as explained with regard to FIG. 2. Therefore, bottom face plate 480 is smaller than top face plate 450. Top face plate 450 embeds two LEDs 430 and 440 and a switch 420. Again, switch 420 may be a push button or on/off switch. LEDs 430 and 440 indicate the operation mode of the respective socket. Whenever a user pushes switch 320 the system processor/baseboard management controller (not shown) is notified that a card is to be inserted on a bus slot or removed from the bus slot. Furthermore, the system controller is informed that the power is to be toggled for the respective bus slot. To indicate this mode for the user, the LEDs 430 and 440 are used. For example, LED 440 is a green LED which is lit whenever the system is ready to operate. If it is turned off or flashing this indicates that the power has been toggled and a card may be removed or inserted. Furthermore, LED 430 might be used to indicate any failure or malfunction while removing or installing a card. Therefore, LED can be for example an amber colored LED. In another embodiment only a single LED can be used which then is a LED of the bi-color type. If an error occurs during hardware or software installation this LED can signal this to the user by changing its color, for example, from green to red. Flashing can be used to indicate a hot-plug mode. The socket is again designed to either include the driver circuits for the LEDs 430, 440 and switch 420, and receive all necessary signals from the slot connectors (not shown) or provide additional contacts to supply the LEDs 430, 440 and switch 420.

Figure 5:
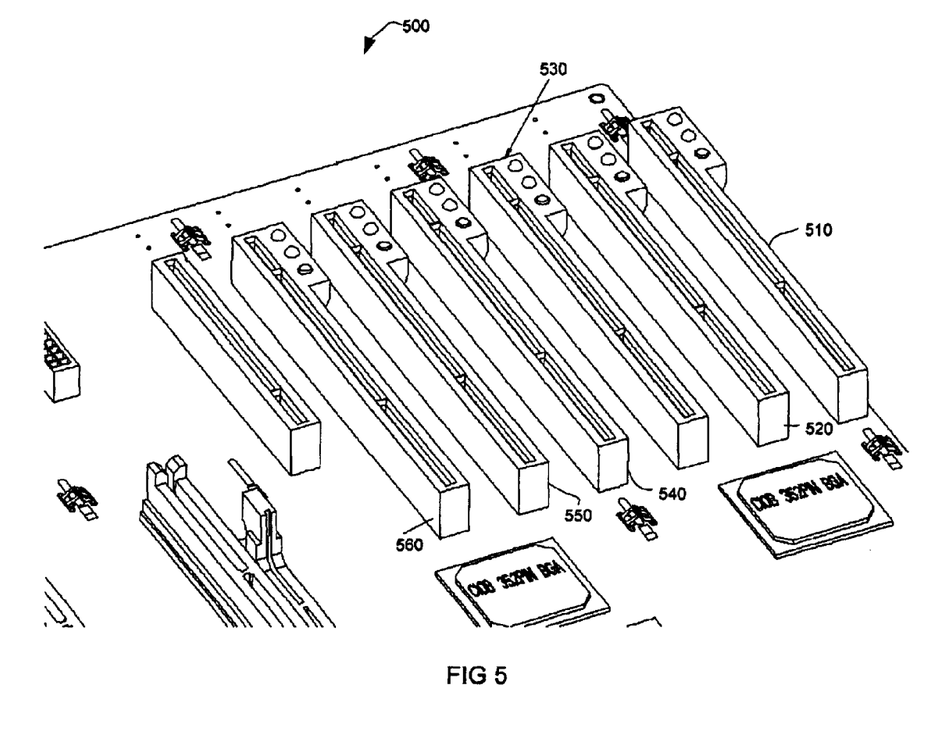
FIG. 5 is a perspective view on a mother board having 6 expansion slots (sockets) according to one embodiment of the present invention.

FIG. 5 shows a plurality of bus sockets according to the embodiment of FIG. 4 placed commonly on a mother board of a computer system. Again, as can be readily seen, the improved sockets do not require a lot of additional real estate on the mother board. In particular, the cut off portion 470 allows placement of devices on the mother board. Thus, no or only minimal redesign of a mother board might be necessary.

Figure 6:
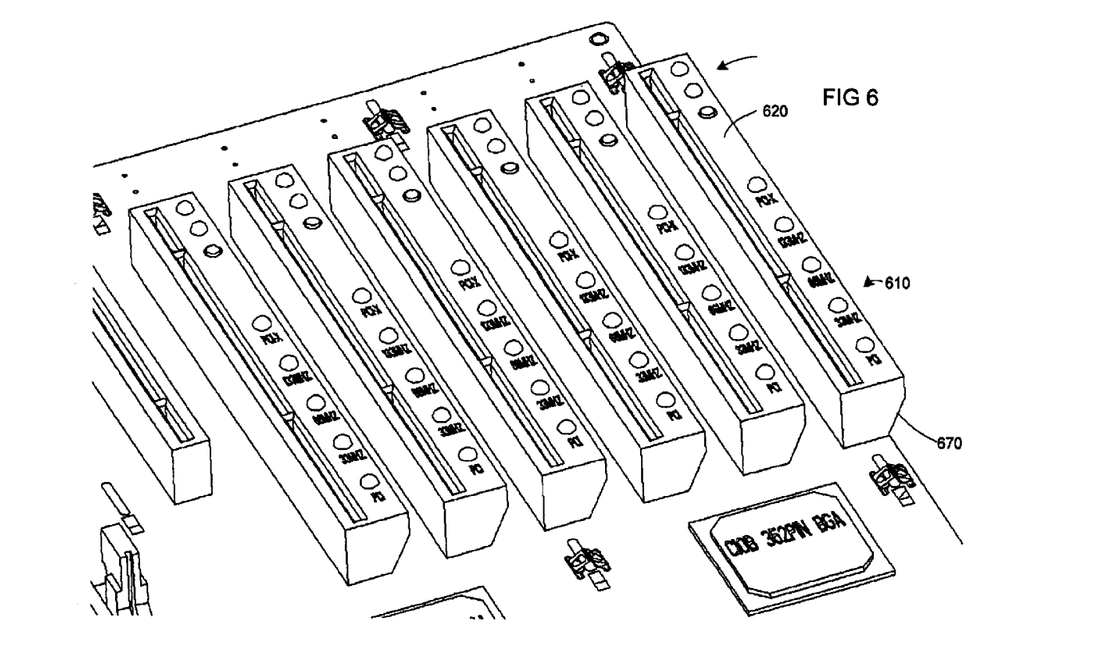
FIG. 6 is a perspective view on a mother board having 6 expansion slots (sockets) according to another embodiment of the present invention.

FIG. 6 shows a plurality of bus sockets according to a combination of the embodiments of FIG. 2 and 4 placed commonly on a mother board of a computer system. The design of each socket combines the features of the above mentioned embodiments. Thus, each socket comprises a plurality of LEDs in the lower area of 610 of the face plate 620 and the hotplug indicators and switch placed in the upper area 630 of the right side of face plate 620. Again, as can be readily seen, the improved sockets do not require a lot of additional real estate on the mother board. In particular, the cut off portion 670 allows placement of devices on the mother board. Thus, no or only minimal re-design of a mother board might be necessary.

Figure 7:
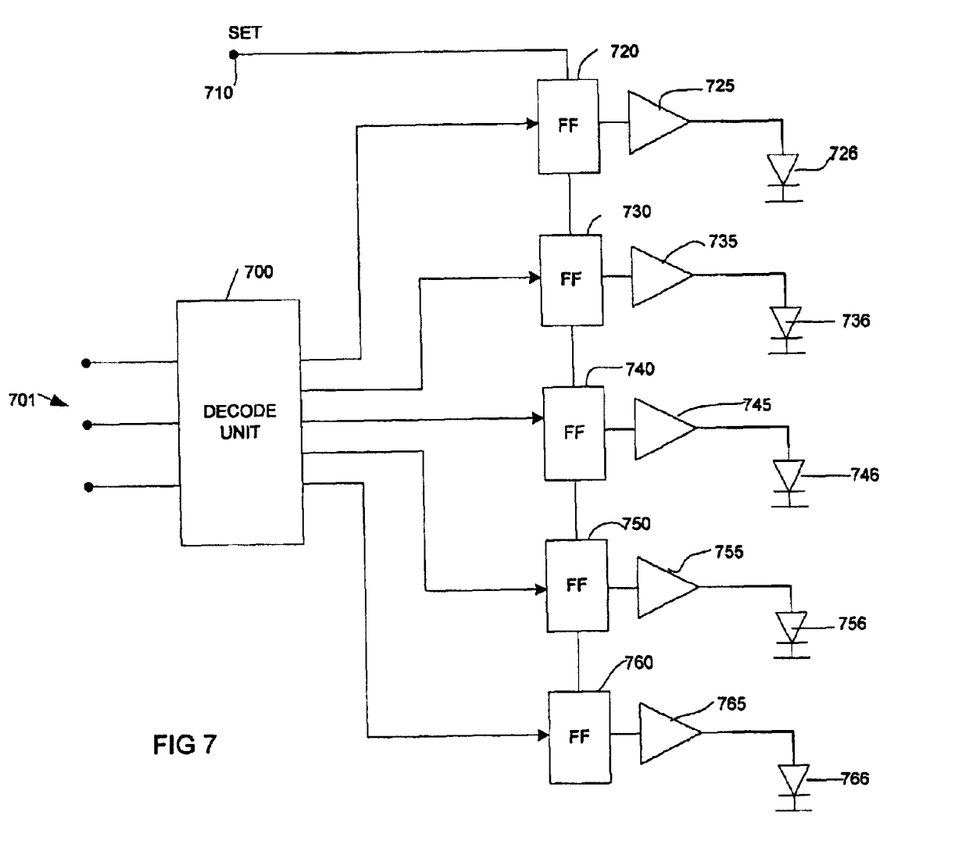
FIG. 7 shows a circuit suitable for driving the indicators according to the first embodiment of the present invention.

FIG. 7 shows a first embodiment of a control circuit capable of driving the indicator LEDs. Appropriate status signals 701 are generated by the system processor/baseboard management controller (not shown) or can be derived directly from the bus signals. For example, the status of the bus may be encoded in a binary code transmitted through lines 701. This code is fed to a decode unit 700. Decode unit 700 comprises five outputs which are coupled to inputs of five flip-flops 720, 730, 740, 750, and 760. A set signal 710 is provided and fed to set inputs of flip-flops 720, 730, 740, 750, and 760. Each flip-flop 720, 730, 740, 750, and 760 comprises an output which is coupled with an associated driver 725, 735, 745, 755, and 765. Each driver controls an associated LED 726, 736, 746, 756, and 766, respectively.

Signal lines 701 carry an encoded information about the current bus status. For example, one line can indicate whether the bus is operating in a PCI or a PCI-X mode. The other two lines can indicate four different bus speeds, for example, 33 MHz, 66 MHz, 100 MHz, and 133 MHz. In the present embodiment, only three bus speeds are used, namely 33 MHz, 66 MHz, and 133 MHz. Decode unit 700 decodes this information and provides flip-flops 720, 730, 740, 750, and 760 with the respective signals. Set signal 710 is either activated every time a status change takes place or, for example, periodically. Set signal 710 indicates to flipflops 720, 730, 740, 750, and 760 that the information provided at each input has to be transferred into the respective flip-flop register. The output of each flip-flop 720, 730, 740, 750, and 760 carries the content of the flipflop register and respective LEDs 726, 736, 746, 756, and 766 are driven with a respective signal through drivers 725, 735, 745, 755, and 765, respectively. This control circuit is designed to store the current status, even if power supply lines of the bus connectors are turned off to allow inserting or exchanging of expansion cards.

Figure 8:
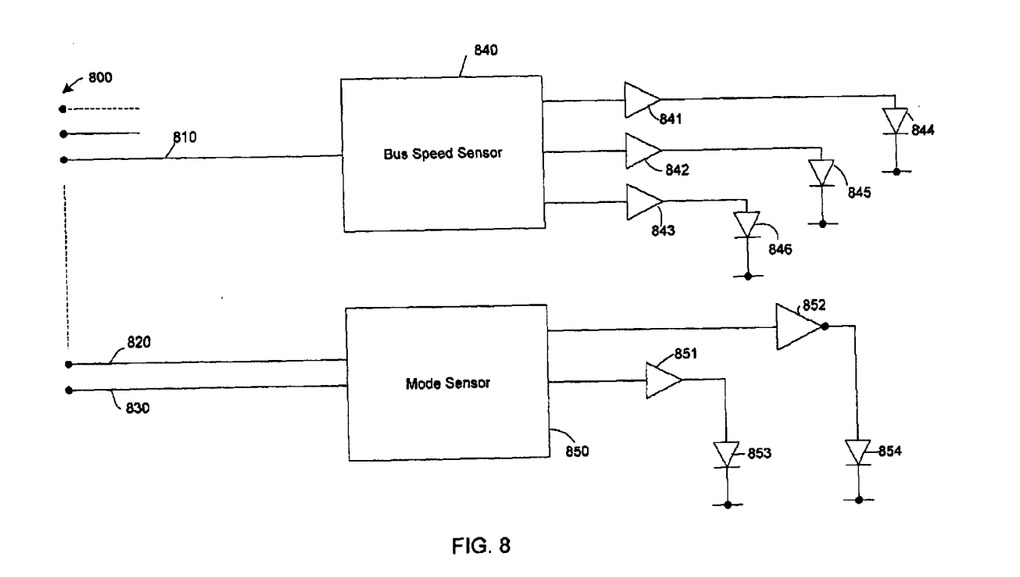
FIG. 8 shows another circuit suitable for driving the indicators according to the first embodiment of the present invention.

FIG. 8 shows another LED driver/control circuit suitable to be integrated into a socket according to the embodiments of the present invention. Numeral 800 designates the slot contacts within the socket of a bus system. In this example, it is assumed that three signals are needed to determine the bus mode and speed. Signal 810 is used to determine the bus speed and can be, for example, a system clock signal provided on the bus. This signal is fed to the input of a bus speed sensor unit 840. In another embodiment, a bus might provide different signal lines digitally indicating the current bus speed. In such an environment a decoder is used rather than a bus speed sensor. Bus speed sensor 840 comprises circuitry to detect the different clock signal frequencies and drives respective LEDs 844, 845, and 856 through associated drivers 841, 842, and 843, respectively. In this example, two signals 820 and 830 are used to determine the bus mode. Any other suitable signal or signals can be used to determine the current mode. These signals 820 and 830 are fed to mode sensor unit 850 which drives respective LEDs 853 and 854.

In this embodiment it is assumed that the mode will be either a PCI mode or a PCI-X mode. Therefore only one output signal is used to drive the LEDs 853 and 854. Driver 851 drives LED 853 and inverter 852 drives LED 854. Both, driver 851 and inverter 852 receive the output signal from mode sensor unit 850.

Figure 9:
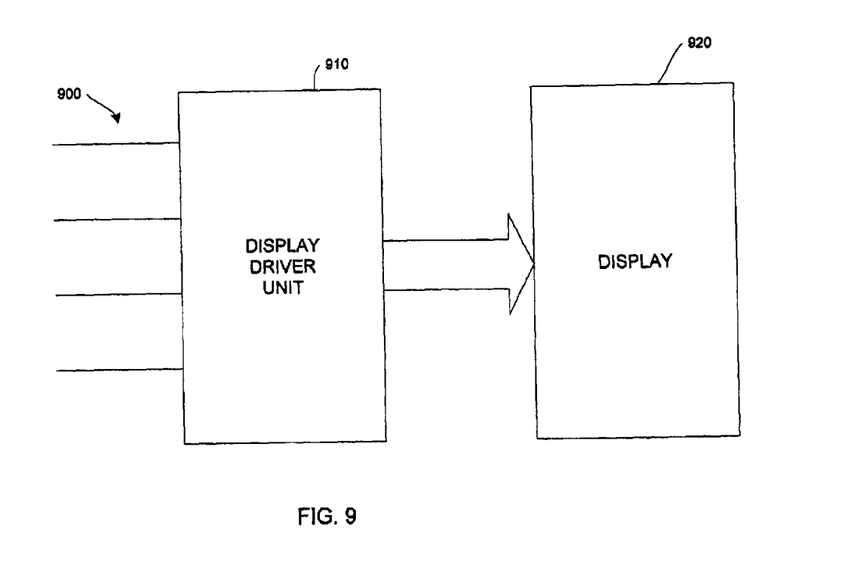
FIG. 9 shows yet another circuit suitable for driving a display according to the second embodiment of the present invention.

FIG. 9 depicts a block diagram showing a suitable control circuit for the second embodiment according to the present invention. Status lines 900 are either provided by the bus itself or by a system processor/baseboard management controller (not shown). These signals are fed to a display driver unit 910 which encodes the information carried on signal lines 900 and drives display unit 920. Display unit 920 can be a liquid crystal display (LCD) or a LED display. Display driver 910 generates all necessary signals to control and drive such a display. The display driver may be embedded in each socket of the bus system that comprises a display or be part of the system processor/baseboard management controller (not shown). In this case additional lines are provided for the socket.

In preferred embodiments of the present invention all indicators and their respective control and driver circuitry are integrated in the respective socket. Thus, existing main boards or mother boards can be used without changing the layout and design. However, a less expensive solution can provide a common driver and control unit within the system processor/baseboard management controller and provide additional signal lines for the socket which directly drive each individual indicator, such as LEDs, LCDs, etc.

The exemplary embodiments of the present invention inform a user precisely about the status of each slot. A user will therefore readily see which slots are suitable for a respective adapter card. Thus, for example, a PCI-X bus that is designed for PCI-X 133 MHz adapter cards is running at full speed and is optimized when only PCI-X 133 MHz adapter cards are installed in that bus. The improved bus sockets indicate the status to a user thus providing the ability of maintaining a desired mode for a specific bus in a computer system.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Computer system including a circuit board comprising:
    a bus for transmitting address, data and control signals with selectable bus configuration;
    a plurality of bus sockets on said circuit board for connecting an adapter card with said bus signals, whereby the specification of said adapter card determines the configuration of the bus; and
    an indicator for said bus displaying said configuration, wherein said indicator is integrated in one of said bus sockets.

2. Computer system according to claim 1, further comprising a plurality of busses having independent selectable configurations and each bus comprises at least one socket with an integrated indicator displays said bus configuration.

3. Computer system according to claim 1, wherein said bus provides a plurality of selectable bus speeds and said indicator further displays said selected bus speed.

4. Computer system according to claim 3, wherein said indicator comprises a light emitting diode for each of said plurality of clock speeds.

5. Computer system according to claim 3, wherein said bus provides a plurality of selectable bus modes and said indicator comprises a liquid crystal display for displaying said clock speed and bus mode.

6. Computer system according to claim 3, wherein said bus provides a plurality of selectable bus modes and said indicator comprises an alpha-numeric display for displaying said clock speed and bus mode.

7. Computer system according to claim 1, wherein said bus provides a plurality of selectable bus modes and said indicator further displays said selected bus mode.

8. Computer system according to claim 7, wherein said indicator comprises a light emitting diode for each of said bus modes.

9. Computer system according to claim 1, wherein said one of said bus sockets further comprises an integrated control unit driving said indicator.

10. Computer system according to claim 9, wherein said one of said bus sockets comprises a plurality of connectors for connecting said plurality of data, address and control signals and wherein said control unit is coupled with at least one of said connectors.

11. Computer system according to claim 1, wherein said one of said bus sockets further comprises a switch for enabling a hot-plug mode.

12. Computer system according to claim 11, wherein said one of said bus sockets further comprises a hot-plug indicator for displaying said hot-plug mode.

13. Computer system according to claim 12, wherein said one of said bus sockets comprises an enlarged area in which said hot-plug switch and said hot-plug indicator are integrated.

14. Computer system according to claim 13, wherein said one of said bus sockets comprises left and right side walls, whereby an upper portion of one of said side walls is at least partially extended outwards to receive said integrated hot-plug switch and indicator.

15. Computer system according to claim 11, wherein said one of said bus sockets further comprises hot-plug error indicator means for displaying an error which occurred during a hot-plug mode.

16. Computer system according to claim 1, wherein said bus is a PCI-bus.

17. Computer system according to claim 1, wherein said bus is a PCI-X-bus.

18. Computer system according to claim 1, wherein said one of said bus sockets comprises an enlarged area in which said indicator is integrated.

19. Computer system according to claim 18, wherein said one of said bus sockets comprises left and right side walls, whereby an upper portion of one of said side walls is extended outwards to receive said integrated indicator.

20. Method of indicating a bus speed within a computer system having a system bus with a plurality of sockets for receiving system adapter cards, whereby the specification of said adapter cards determines the bus configuration, and whereby at least one socket of said plurality of sockets comprises an integrated indicator, the method comprising the steps of:

inserting an adapter card in one of the plurality of bus sockets;

determining and setting the bus speed for all sockets associated to said bus; and displaying said bus configuration for said bus by said indicator.

21. Method according to claim 20, further comprising the steps of:

providing an indicator for each socket; and displaying said bus configuration for each socket depending on the determined bus configuration.

22. Method according to claim 20, wherein said system bus comprises a plurality of busses, said method further comprising the steps of:

providing indicator means for each socket of each bus; and displaying said bus configuration for each socket of each bus depending on the determined bus configuration.

23. Method according to claim 20, wherein said bus configuration includes a bus speed.

24. Method according to claim 20, wherein said bus configuration includes a bus mode.

25. Method according to claim 20, wherein said bus configuration determination is performed during initialization of an inserted adapter card.

26. Method according to claim 24, further comprising the step of:

determining a bus mode; and displaying said bus mode by said indicator.

27. Socket for a configurable computer bus comprising a slot with a plurality of slot contacts to which a plurality of address, data and control signals can be supplied from said configurable computer bus, wherein said slot is designed to receive an adapter card which can be plugged into said slot to couple said adapter card with said configurable computer bus, and wherein said socket comprises an indicator for displaying a respective bus configuration.

28. Socket according to claim 27, further comprising a second indicator for displaying a bus speed.

29. Socket according to claim 27, further comprising a third indicator for displaying a bus mode.

30. Socket according to claim 27, further comprising a switch for enabling a hot-plug mode.

31. Socket according to claim 27, further comprising a hot-plug indicator displaying whether a hot-plug mode is enabled.

32. Socket according to claim 31, further comprising a switch for enabling a hot-plug mode, wherein said socket comprises an enlarged area in which said hot-plug switch and said hot-plug indicator are integrated.

33. Socket according to claim 32, wherein said socket comprises left and right side walls, whereby an upper portion of one of said side walls is at least partially extended outwards to receive said integrated hot-plug switch and indicator.

34. Socket according to claim 27, further comprising a hot-plug error indicator displaying whether an error during a hot-plug mode occurred.

35. Socket according to claim 27, wherein said socket comprises an enlarged area in which said indicator is integrated.

36. Socket according to claim 35, wherein said socket comprises left and right side walls, whereby an upper portion of one of said side walls is extended outwards to receive said integrated indicator.

37. Socket according to claim 27, wherein said socket is a PCI socket.

38. Socket according to claim 27, wherein said socket is a PCI-X socket.

39. Socket according to claim 27, further comprising an integrated control unit for driving said indicator.

40. Socket according to claim 39, wherein said socket comprises a plurality of connecting said plurality of data, address and control signals and wherein said control unit is coupled with at least one of said connectors.

* * * * *